(12) United States Patent
Schaaf et al.

(10) Patent No.: US 8,709,189 B2
(45) Date of Patent: Apr. 29, 2014

(54) METHOD FOR FABRICATION OF INTEGRATED LIGHTNING STRIKE PROTECTION MATERIAL

(75) Inventors: America Olsen Schaaf, Seattle, WA (US); Anthony Huy Nguyen, Kenmore, WA (US)

(73) Assignee: The Boeing Company, Chicago, IL (US)

(*) Notice: Subject to any disclaimer, the term of this patent is extended or adjusted under 35 U.S.C. 154(b) by 85 days.

(21) Appl. No.: 13/401,837

(22) Filed: Feb. 21, 2012

(65) Prior Publication Data

US 2012/0145319 A1   Jun. 14, 2012

Related U.S. Application Data

(62) Division of application No. 12/102,727, filed on Apr. 14, 2008, now Pat. No. 8,206,823.

(51) Int. Cl.
*B32B 37/14* (2006.01)

(52) U.S. Cl.
USPC ............ 156/192; 156/195; 156/523; 156/574; 156/577

(58) Field of Classification Search
USPC ......... 156/523, 574, 577, 166, 184, 191, 192, 156/195
See application file for complete search history.

(56) References Cited

U.S. PATENT DOCUMENTS

| | | | |
|---|---|---|---|
| 3,068,121 A | 12/1962 | Weschler | |
| 4,755,904 A | 7/1988 | Brick | |
| 5,225,265 A | 7/1993 | Prandy et al. | |
| 5,370,921 A | 12/1994 | Cedarleaf | |
| 5,470,413 A | 11/1995 | Cedarleaf | |
| 5,513,537 A | 5/1996 | Brooks et al. | |
| 7,050,286 B2 | 5/2006 | Pridham et al. | |
| 7,277,266 B1 | 10/2007 | Le et al. | |
| 2002/0081921 A1 | 6/2002 | Vargo et al. | |
| 2005/0039844 A1 | 2/2005 | Engwall et al. | |
| 2006/0143920 A1 | 7/2006 | Morrison et al. | |
| 2006/0162143 A1* | 7/2006 | Nelson et al. | 29/431 |
| 2006/0292375 A1 | 12/2006 | Martin | |
| 2007/0141927 A1 | 6/2007 | Brown | |
| 2007/0281122 A1 | 12/2007 | Blanchard et al. | |
| 2009/0269596 A1* | 10/2009 | Rocker et al. | 428/457 |

FOREIGN PATENT DOCUMENTS

| | | |
|---|---|---|
| EP | 0431916 | 6/1991 |
| JP | 2006219078 | 8/2006 |
| WO | 2008015082 | 2/2008 |
| WO | 2008025959 | 3/2008 |

OTHER PUBLICATIONS

International Search Report and Written Opinion, Issued Oct. 2, 2009, for corresponding International Application No. PCT/US2009/036122.

* cited by examiner

*Primary Examiner* — Scott W Dodds

(57) ABSTRACT

The invention is directed to an integrated lightning strike protection system adapted for automated placement on a composite structure having a surfacing layer consisting of an organic polymer resin, a conductive layer of an expanded metal foil, an isolation/tack layer, and a carrier paper layer. In another embodiment of the invention, there is provided an integrated lightning strike protection system having an integrated lightning strike protection material consisting of an expanded metal foil encapsulated in organic polymer resin mounted on a carrier paper, and an automated placement machine suitable for placing the material on an aircraft composite part for protection of the composite part from lightning strikes. In another embodiment of the invention, there is provided a method for fabricating a composite structure with lightning strike protection.

20 Claims, 5 Drawing Sheets

METHOD FOR FABRICATION OF INTEGRATED LIGHTNING STRIKE PROTECTION MATERIAL

CROSS-REFERENCE TO RELATED APPLICATION

The present application is a divisional of and claims priority to pending application Ser. No. 12/102,727, filed Apr. 14, 2008, and entitled SYSTEM AND METHOD FOR FABRICATION OF INTEGRATED LIGHTNING STRIKE PROTECTION MATERIAL, the entire contents of which is incorporated herein by reference.

BACKGROUND

1. Field of the Disclosure

A system and method for fabrication of integrated lightning strike protection material are provided. More particularly, a system and method for the fabrication of automated placement of integrated metal resin lightning strike protection material on a composite structure are provided.

2. Description of Related Art

Aircraft and aerospace structures are increasingly being made of composite materials, such as carbon fiber reinforced plastics (CFRP), rather than aluminum alloy and similar metallic materials formerly used, largely because composite materials improve structural performance, provide favorable strength and stiffness characteristics, and reduce aircraft weight. However, composite materials are less conductive than metallic materials and are less capable of withstanding lightning strikes. Composite materials cannot distribute current and heat from a lightning strike, which is typically about 100,000 Amperes at 50,000 Volts, as quickly as metallic materials. Known systems and methods have been developed to provide lightning strike protection for composite structures such as aircraft and aerospace structures. Several known systems and methods add metallic conductors or incorporate metal foil systems of various configurations into composite exterior surfaces of the aircraft, such as skin panels on the wings and fuselage, to provide improved electrical conductivity and distribute and divert current away from flight critical areas and underlying aircraft components, thus minimizing physical damage from lightning strike events. The addition of metallic conductors may include applique-based systems that use alternate layers of dielectric and conductive materials applied over the composite structure surface and secured to the surface with an adhesive. This insulates underlying aircraft components from a lightning strike and provides a conductive path for rapid distribution and dissipation of lightning current and heat. The incorporation of metal foil systems may include the use of copper or aluminum foil in either solid or expanded mesh form that is laminated into and co-cured with the composite material. This system provides a conductive path for diversion and distribution of lightning current which, in combination with special fasteners and other features, provides a degree of lightning strike protection for composite structures. However, such known systems and methods often involve manual, tedious, and time consuming placement of multiple material components necessary for effective integration of the lightning strike protection system.

In addition, known systems and methods for lightning strike protection are generally made by individually layering a surfacing top layer to provide a smooth surface for application of subsequent topcoat finish systems, a metal foil layer to conduct lightning current, and an optional isolation layer, typically a resin-reinforced fiberglass ply, to prevent galvanic corrosion and improve thermal expansion mismatches that cause paint and interlaminate cracking. For example, a lightning strike protection material for composite structures is disclosed in U.S. Pat. No. 5,225,265, where the epoxy layer and metal foil layer are not integrated and are individually layered on top of each other. However, the lay-up of these known multilayer systems in separate plies is time consuming and labor intensive. In addition, problems may arise with material wrinkling, contamination, and mishandling of the material. Material tack to tool or composite substrate may also be a challenge when materials are applied individually.

Several material suppliers have offered integrated expanded metal foil and epoxy-based films which minimally improve manufacturing flow time and handling. For example, a known process of making a lightning strike composite is disclosed in U.S. Pat. No. 5,470,413, which provides for a multilayered composite comprising a layer of expanded metal foil, a single layer of epoxy-based resin film, and a carrier layer. Another known system is disclosed in U.S. Pat. No. 7,277,266 for a lightning protection system for a composite structure that is directed to a lightning protection applique. However, this known system uses an applique that is not co-cured and it uses a pressure-sensitive adhesive. Moreover, these known systems do not allow for automated manufacturing processes to support high volume processing, and in particular, automated handling, cutting, and placement. In addition, known integrated systems may also need additional surfacing layers, such as epoxy surfacing layers, to provide sufficient surfacing, sealing, and smoothness to meet environmental requirements for aerospace applications. While some known systems may be designed to meet environmental requirements, they have not been optimized within the restraints of automatability and minimum weight. Integrated systems designed for lightning strike protection and/or environmental durability have not been created with flexibility and tack requirements. They do not have the tack on both sides so they are unable to go onto contoured surfaces as easily. Moreover, tack on both sides is necessary to stably spool material in automated placement systems. If there are some minorly integrated systems, they have tack only on one side.

Accordingly, there is a need for a system and method for fabrication of integrated lightning strike protection material that does not have the problems associated with known systems and methods.

SUMMARY

This need for a system and method for fabrication of integrated lightning strike protection material that does not have the problems associated with known systems and methods, as well as a unique, nonobvious, and advantageous system and method, is satisfied. None of the known systems and methods provides all of the numerous advantages discussed herein. Unlike known systems and methods, the invention may provide one or more of the following advantages: the system and method provide for integrating a resin film, typically epoxy-based, with expanded metal foil and a tack layer on a paper-based carrier paper so that it can be processed in various automated placement machines to support high volume processing such as handling, cutting, and placement, and to support high volume lay-up of lightning protected composite skin systems; the system and method provide for the integration of expanded metal and resin film material components, typically epoxy-based, into one single integrated product, which can be used with existing composite tape and fabric automated placement machines for quick and efficient material placement over flat and contoured composite skin structures to provide protection against electromagnetic effects such as lightning strikes; the system and method provide a material with tack on both sides which is necessary to stably spool the material; the system and method provide an integrated material that is both environmentally durable and is able to work seamlessly with contour tape laying machines, vacuum-assisted bulk placement systems, and other automated placement machines; the system and method provide for improved manufacturing flow time, improved material uniformity, reduced labor hours and resources, and minimized handling and contamination concerns; the system and method provide automation as a stand alone system capable of meeting electromagnetic effects, protection and environmental performance without the addition of extra surface, extra isolators or extra metal; the system and method provide material with improved flexibility that can more easily curve in the x-y plane and curve in the z plane; the system and method provide for a reduced amount of rejected parts or materials that can result from mishandling, contamination, wrinkling, or other manufacturing defects; the system and method require no or minimal additional machine development to place the material on composite structures; and, the system and method provide for overall improved composite parts in terms of appearance and amount of potential defects and irregularities, while providing improved lightning strike and electromagnetic effects protection and environmental durability during service life.

In an embodiment of the invention, there is provided an integrated lightning strike protection system adapted for automated placement on a composite structure comprising: a surfacing layer consisting of an organic polymer resin; a conductive layer of an expanded metal foil; an isolation layer; and, a carrier paper layer.

In another embodiment of the invention, there is provided an integrated lightning strike protection system comprising: an integrated lightning strike protection material consisting of an expanded metal foil encapsulated in organic polymer resin mounted on a carrier paper; and, an automated placement machine suitable for placing the material on an aircraft composite part for protection of the composite part from lightning strikes.

In another embodiment of the invention, there is provided a method for fabricating a composite structure with lightning strike protection comprising: loading an integrated lightning strike protection material into an automated lamination machine, wherein the lightning strike protection material comprises an expanded metal foil encapsulated in organic polymer resin mounted on a carrier paper; and, laminating the material onto an exposed surface of a composite skin to form the composite structure with lightning strike protection.

BRIEF DESCRIPTION OF THE DRAWINGS

The foregoing and other advantages and features, and the manner in which the same are accomplished, will become readily apparent upon consideration of the following detailed description taken in conjunction with the accompanying drawings which illustrate preferred and exemplary embodiments, but which are not necessarily drawn to scale, wherein.

DETAILED DESCRIPTION

Embodiments of the invention now will be described more fully hereinafter with reference to the accompanying drawings, in which some, but not all embodiments of the invention are shown. Indeed, several different embodiments may be provided and should not be construed as limited to the embodiments set forth herein. Rather, these embodiments are provided so that this disclosure will be thorough and complete and will fully convey the scope of the invention to those skilled in the art.

Figure 1:
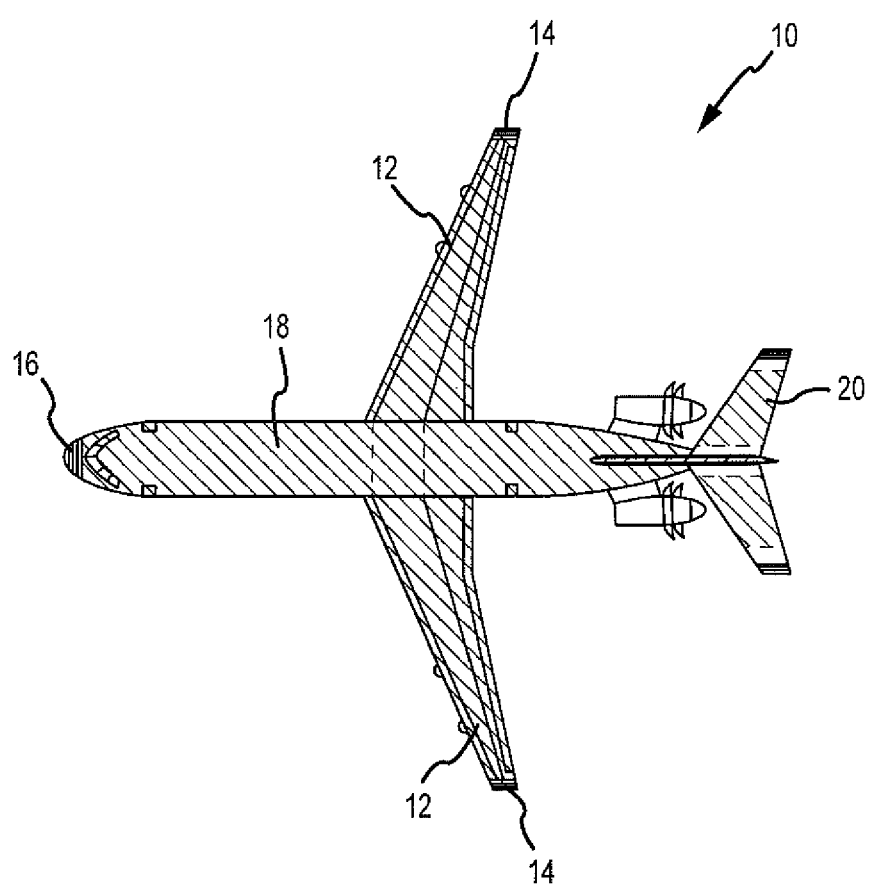
FIG. 1 is a top plan view of an aircraft showing various lightning strike zones on the aircraft.

The invention is directed to a lightning strike protection system and method that is suitable for automated placement or lamination on composite structures or parts, such as aircraft and aerospace composite structures and parts. Referring now to the drawings, FIG. 1 is a top plan view of an aircraft 10 showing various lightning strike zones of the aircraft. Such zones of the aircraft 10 where there is a high probability of direct lightning strike may include wing zones 12, wing tip zones 14, a nose zone 16, fuselage zones 18, and tail zones 20.

Figure 2:
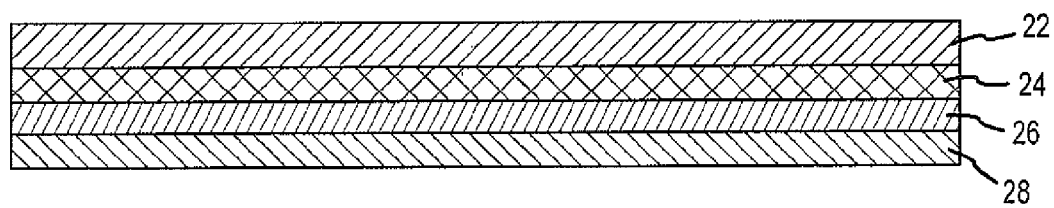
FIG. 2 is a schematic diagram showing a multilayered lightning strike protection material system of the invention.

FIG. 2 is a schematic diagram showing the integrated, multilayered lightning strike protection system of the invention adapted for automated placement on a composite structure, such as an aircraft wing zone, wing tip zone, fuselage zone, tail zone, or nose zone. The invention involves an integrated metal resin lightning protection material system comprising several components where each component is specifically optimized for ideal lightning protection, environmental performance, as swell as automated manufacturing. The system comprises a surfacing layer 22 consisting of an organic polymer resin. Preferably, the organic polymer resin comprises a partially cured phenolic-epoxy resin, such as Cytec Metlbond 1515-3 or Cytec SurfaceMaster 905, obtained from Cytec Engineered Materials, Inc. of Havre de Grace, Md. However, other suitable organic polymer resins may also be used. Preferably, the surfacing layer is epoxy based and designed to encapsulate and environmentally protect a conductive layer 24, discussed below, and may be designed to act as and provide a sacrificial layer for surface preparation and paint system application. Preferably, the surfacing layer has a thickness in the range of 0.002 inch to 0.075 inch. Preferably, the surfacing layer has a weight in the range of 0.015 psf (pounds per square foot) to 0.070 psf.

As shown in FIG. 2, the integrated, multilayered lightning strike protection system further comprises the conductive layer 24 adjacent the surfacing layer 22. The conductive layer comprises an expanded foil. The conductive layer 24 conducts lightning current away from the point of attachment and/or shields electronics/electrical systems against interfering signals. Preferably, the expanded metal foil of the conductive layer comprises copper, aluminum, titanium, nickel, bronze, gold, silver, and alloys thereof, or other conductive metals. Preferably, the conductive layer has a thickness in the range of 0.0015 inch to 0.006 inch. Preferably, the conductive layer has a weight in the range of 0.086 psf to 0.100 psf, Expanded metal foils are preferred to solid metal foils because they are lightweight and offer the potential for automatability due to their ability to flex in the x-y plane and z plane.

As shown in FIG. 2, the integrated, multilayered lightning strike protection system further comprises an isolation or tack layer 26 to galvanically isolate the conductive layer from the underlying carbon fiber reinforced plastic laminate when necessary (i.e. aluminum alloys). The isolation or tack layer is adjacent the conductive layer. Preferably, the isolation or tack layer comprises an epoxy-based resin material, a fiberglass-epoxy prepreg material, a thin adhesive material, or other organic polymer resins. Adhesive on the isolation or tack layer provides tack so the isolation or tack layer can adhere to a side of a carrier paper layer 28 and can improve the application of the adjacent carbon fiber reinforced plastic layer. In certain embodiments, the isolation or tack layer may be of the same composition as the surfacing layer. Preferably, the isolation or tack layer has a thickness in the range of 0.0015 inch to 0.005 inch. Preferably, the isolation or tack layer has a weight in the range of 0.015 psf to 0.060 psf.

As shown in FIG. 2, the integrated, multilayered lightning strike protection system further comprises the carrier paper layer 28 which is adjacent the isolation or tack layer. Preferably, the carrier paper layer comprises suitable paper having a variable tack. More preferably, the carrier paper layer has a low or medium tack. Preferably, the carrier paper layer has a silicone release agent. The silicone provides a slick surface to remove the lightning strike material from the paper. Preferably, the carrier layer has a thickness in the range of 0.004 inch to 0.008 inch. The carrier paper layer is preferably removed and discarded as the material is placed on the composite structure. Thus, when the carrier paper layer is removed from the isolation or tack layer, the exposed tack side of the isolation or tack layer is attached to the surface of the composite structure when the material is placed or laid down on the composite structure.

While flexibility is a driving feature that allows for automatability, overall system thickness, material tack, and carrier paper tack and thickness are also important. Some combinations will require very specific paper characteristics. For example, thinner foil-resin film systems require a thicker carrier paper. The isolation or tack layer is selected based on the appropriateness and compatibility to the metal system and the automated placement machine for which the system is being designed. Preferably, the expanded metal foil is encapsulated in resin and mounted on the carrier paper and wound onto a core at widths specific to the automated placement machine requirements. The types of foil and resins used are dependant on the lightning strike and durability requirements. Parameters such as tack and flexibility are optimized such that the system can be automated. The integrated material is preferably made by embedding the expanded metal foil into the polymer resin in-line while the resin is being filmed, or in a post-processing manner where the partially cured resin has already been filmed and the expanded metal foil is sandwiched in-between the resin film layer and isolation or tack layer or between the resin film layers.

Figure 3:
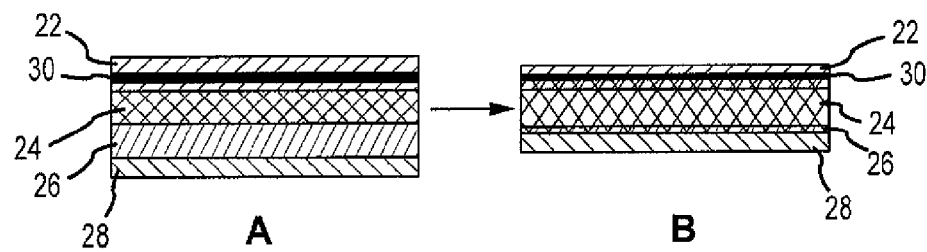
FIG. 3 is a schematic diagram showing precursor materials converted to an integrated product of the multilayered lightning strike protection material system of the invention.

FIG. 3 is a schematic diagram showing precursor materials "A" that comprise the surfacing layer 22 with a fiber reinforcement material layer 30, such as a scrim carrier, typically comprising a fiberglass or carbon fiber reinforcement, woven mat, or knit polyester. The precursor materials "A" further comprise the conductive layer 24, isolation or tack layer 26, and carrier paper layer 28. The precursor materials are combined and integrated to form an integrated product "B" comprising integrated layers of the surfacing layer 22 with fiber reinforcement material layer 30, conductive layer 24, and isolation or tack layer 26, layered on the carrier paper layer 28.

Preferably, the automated placement of the integrated, multilayered lightning strike protection system onto the composite structure is carried out with an automated placement or lamination machine, such as a contour tape laying machine or a vacuum-assisted bulk placement system. Preferably, the contour tape laying machines used with the invention are obtained from MAG Cincinnati of Cincinnati, Ohio, Forest-Line of Toulouse, France, or M. Torres of Pamplona, Spain. Preferably, the contour tape laying machines are capable of high rate composite tape lay-up over large contoured parts and typically accommodate lightning protection material widths of 6 inches or 12 inches. Vacuum-assisted bulk placement systems have larger surface areas and can accommodate lightning protection material widths up to 48 inches. The lightning strike protection system is loaded onto the automated placement machine, and the automated placement machine places or laminates the lightning strike protection system over the composite structure or tool. The laminated composite structures or parts having the integrated lightning protection material may be later assembled into an aircraft.

Figure 4:
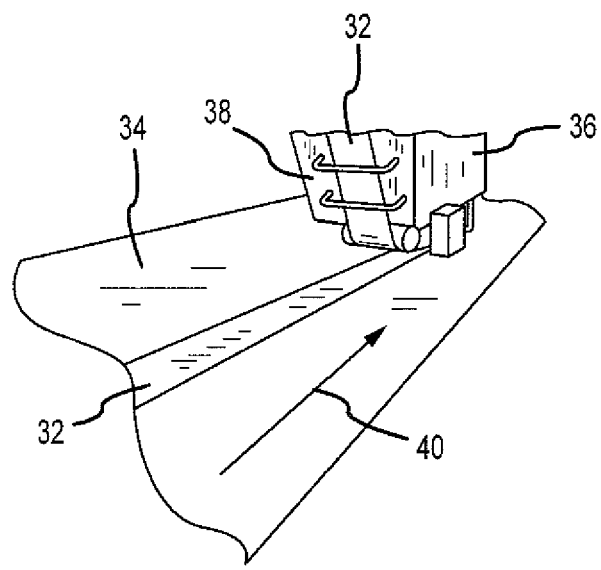
FIG. 4 is a perspective back view of a contour tape laying machine laying down the integrated lightning strike protection material system of the invention on a composite structure.
Figure 5:
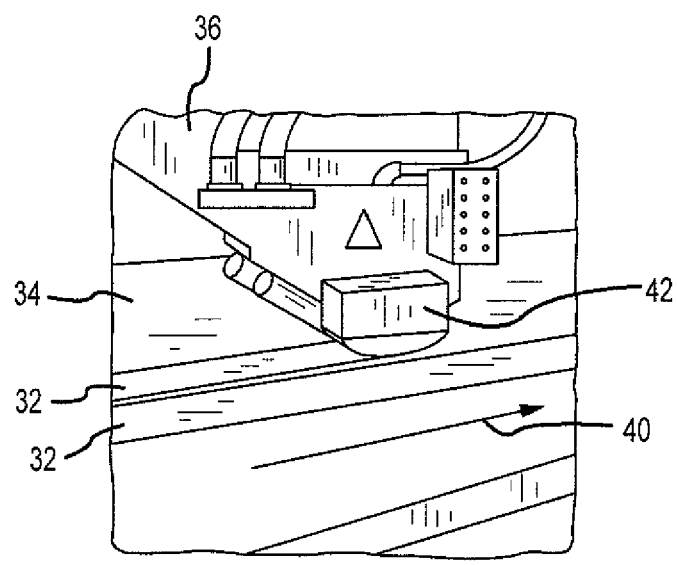
FIG. 5 is a perspective side view of the contour tape laying machine of FIG. 4 laying down the integrated lightning strike protection material system of the invention on a composite structure.
Figure 6:
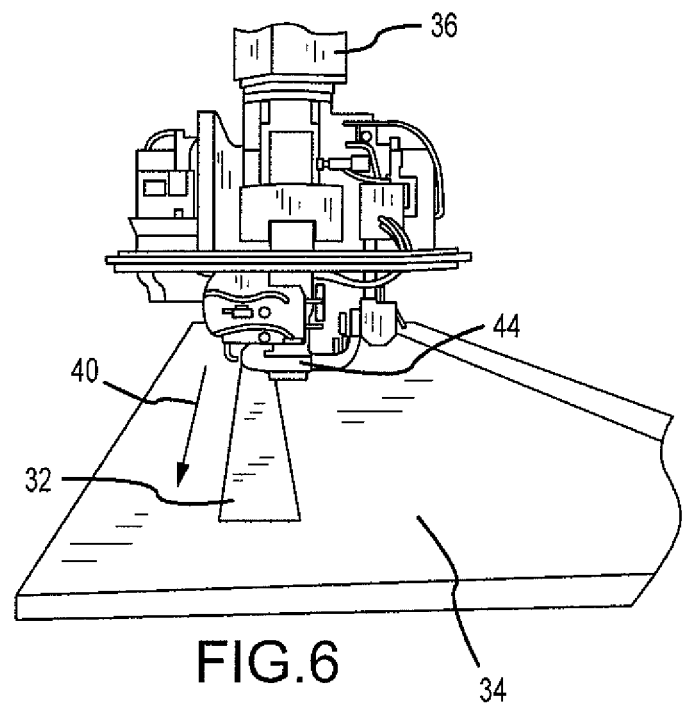
FIG. 6 is a perspective front view of the contour tape laying machine of FIG. 4 laying down the integrated lightning strike protection material system of the invention on a composite structure.
Figure 7:
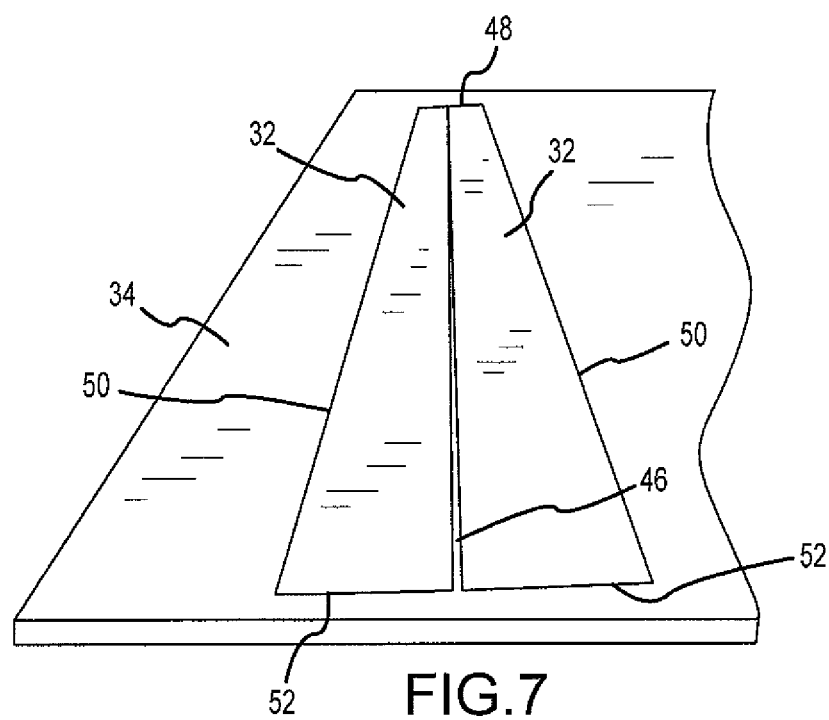
FIG. 7 is a front perspective view of the finished placement of the integrated lightning strike protection material system of the invention on a composite structure; and, FIG. 8 is a front perspective view of the finished placement of two integrated lightning strike protection material systems of the invention on a composite structure.

FIG. 4 shows an integrated lightning strike protection material 32 according to the system and method of the invention being placed or laid up on an exposed surface of a composite skin 34 by a conventional contour tape laying machine 36. FIG. 4 shows a perspective back view of a back end 38 of the contour tape laying machine 36 laying the material 32 in direction 40. FIG. 5 is a perspective side view of a side 42 of the contour tape laying machine 36 of FIG. 4 laying down the integrated lightning strike protection material 32 of the invention on the composite skin 34 in direction 40. FIG. 6 is a perspective front view of a front end 44 of the contour tape laying machine 36 of FIG. 4 laying down the integrated lightning strike protection material 32 of the invention on the composite skin 34 in direction 40. FIG. 7 is a front perspective view of the finished placement or lamination of two pieces of the integrated lightning strike protection material 32 of the invention on the composite skin 34 by the contour tape laying machine. The finished placed or laminated material 32 has a starting end 48 where the starting end 48 of one piece of material 32 slightly overlaps with the starting end of the other piece of material 32. Each piece of the finished placed material 32 has a spaced side end 50 that is laid down at a slight angle. Each piece of the finished placed material 32 has a finishing end 52 where the finishing end 52 of one piece of material 32 forms a small gap 46 with the finishing end 52 of the other piece of material 32. With this invention it is possible to control exactly where and how the material is laid down or placed on the composite skin or lay-up tool.

Figure 8:
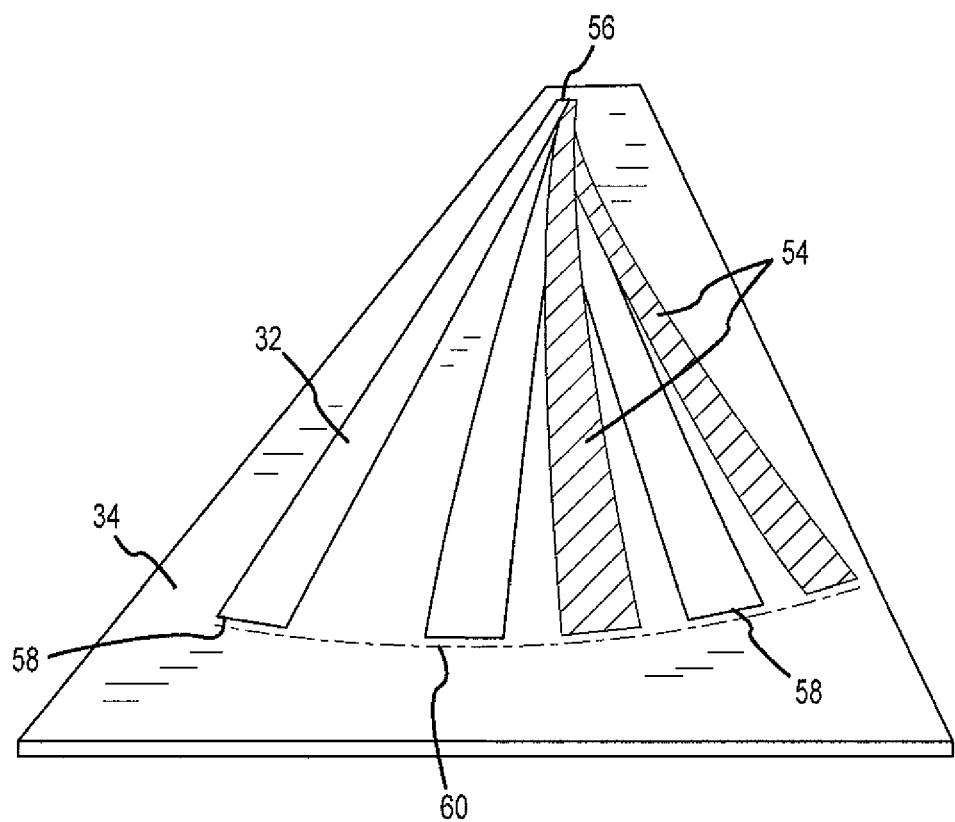

FIG. 8 is a front perspective view of the finished placement of several pieces of two integrated lightning strike protection materials 32, 54 of the invention on the composite skin 34 by a contour tape laying machine (not shown). The finished placed or laminated material 32, 54 has a starting end 56 where the starting end 56 of material 32 overlaps with the starting end 56 of material 54. Each piece of the finished placed material 32, 54 has a finishing end 58 where the finishing ends 58 of material 32 are spaced from the finishing ends 58 of material 54. The finishing ends 58 of material 32, 54 form a curve 60, and as each piece is continuously laid down from start to finish, the radius of curvature decreases with each subsequent piece that is laid down. With this invention it is possible to control exactly where and how the material is laid down or placed on the composite skin or lay-up tool. Advantages of the lightning protection material and system of the invention include the ability to conform to contours and the curving capabilities in the x-y plane and the z plane due to the expanded metal foil geometry within the resin film.

In another embodiment, the invention is directed to an integrated lightning strike protection system comprising: an integrated lightning strike protection material consisting of an expanded metal foil encapsulated in organic polymer resin mounted on a carrier paper; and, an automated placement machine suitable for placing the material on an aircraft composite part for protection of the composite part from lightning strikes. Preferably, the automated placement comprises a contour tape laying machine. It should be noted that the particulars relating to the embodiment of the invention, as described above and in relation to the Figures, apply with equal force to the particulars of this embodiment of the invention.

In another embodiment, the invention is directed to a method for fabricating a composite structure with lightning strike protection. The method comprises the step of loading an integrated lightning strike protection material into an automated lamination machine. Preferably, the lightning strike protection material comprises an expanded metal foil encapsulated in organic polymer resin mounted on a carrier paper. The method further comprises the step of laminating the lightning strike protection material onto an exposed surface of a composite skin to form the composite structure with lightning strike protection. Preferably, the automated lamination machine comprises a contour tape laying machine. Preferably, the composite structure comprises an aircraft wing zone, fuselage zone, tail zone, or nose zone. Preferably, the method is carried out at ambient temperature, and preferably, the method can be performed in a matter of hours depending on how large a composite is to be laminated. It should be noted that the particulars relating to the embodiment of the invention, as described above and in relation to the Figures, apply with equal force to the particulars of this embodiment of the invention.

The invention provides an integrated material that is both environmentally durable and is able to work seamlessly with contour tape laying machines and other automated placement machines. The material systems covered by this invention are designed with the explicit purpose of automation, and as a stand alone system capable of meeting electromagnetic effects protection, such as protection against lightning strikes, and environmental performance. This invention provides improved manufacturing flow time, reduced labor and resources, minimized handling and contamination concerns, and improved composite parts in terms of appearance and amount of potential defects and irregularities, while providing improved lightning strike and electromagnetic effects protection, and environmental durability during service-life.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for fabrication of a single integrated lightning strike protection material product optimized for controlled automated placement via a contour tape laying machine (CTLM) directly on a composite structure or a tool, the method comprising:
   an integrated lightning strike protection material that works seamlessly with a the contour tape laying machine (CTLM), the integrated lightning strike protection material comprising:
   a surfacing layer with a fiber reinforcement material layer, the surfacing layer including an organic polymer resin;
   a conductive layer comprising an expanded metal foil encapsulated in the organic polymer resin and having an ability to flex in an x-y plane and in a z plane, the conductive layer adjacent the surfacing layer;
   a tack layer adjacent the conductive layer, the tack layer being compatible with the expanded metal foil and with the CTLM; and,
   a carrier layer adjacent the tack layer,
   optimizing parameters of the surfacing, conductive, tack, and carrier layers for controlled automated manufacturing placement via the contour tape laying machine (CTLM) directly on the composite structure or the tool, wherein the parameters are selected from the group consisting of flexibility, tack, lightning strike protection, and environmental performance, and
   laying UP the integrated lightning strike protection material directly onto the composite structure or tool with the CTLM.

2. The method of claim 1 wherein the surfacing layer has a thickness in a range of 0.002 inch to 0.075 inch, and the conductive layer has a thickness in a range of 0.0015 inch to 0.006 inch.

3. The method of claim 1 wherein the fiber reinforcement material layer is a scrim carrier comprising a fiberglass or carbon fiber reinforcement, a woven mat, or a knit polyester.

4. The method of claim 1 wherein the expanded metal foil comprises copper, aluminum, titanium, nickel, bronze, gold, silver, or alloys thereof.

5. The method of claim 1 wherein the tack layer has a thickness in a range of 0.0015 inch to 0.005 inch, and further wherein the tack layer comprises an epoxy-based resin material, a fiberglass-epoxy prepreg material, an adhesive material, or an organic polymer resin.

6. The method of claim 1 wherein the carrier layer comprises paper having a tackiness, and the carrier layer has a thickness in a range of 0.004 inch to 0.008 inch.

7. The method of claim 1 wherein the parameter of flexibility is optimized by the expanded metal foil having the ability to flex in the x-y plane and in the z plane; the parameter of tack is optimized by the integrated lightning strike protection material having tack on both sides to stably spool in the CTLM and by the tack layer being compatible with the expanded metal foil and with the CTLM; the parameter of lightning strike protection is optimized by selecting the expanded metal foil and the organic polymer resin capable of meeting electromagnetic effects protection; and, the parameter of environmental performance is optimized by selecting the expanded metal foil and the organic polymer resin capable of meeting environmental durability requirements for the integrated lightning strike protection material.

8. A method for fabricating a composite structure having lightning strike protection, the method comprising:
  loading at ambient temperature an integrated lightning strike protection material into an automated contour tape laying machine (CTLM), wherein the integrated lightning strike protection material is optimized for controlled automated placement via the CTLM, the integrated lightning strike protection material comprising:
    a surfacing layer with a fiber reinforcement material layer, the surfacing layer including an organic polymer resin;
    a conductive layer comprising an expanded metal foil encapsulated in the organic polymer resin and having an ability to flex in an x-y plane and in a z plane, the conductive layer adjacent the surfacing layer;
    a tack layer adjacent the conductive layer, the tack layer being compatible with the expanded metal foil and with the CTLM; and,
    a carrier layer adjacent the tack layer, and,
    wherein the surfacing, conductive, tack, and carrier layers have parameters optimized for controlled automated placement via the CTLM, the parameters selected from the group consisting of flexibility, tack, lightning strike protection, and environmental performance;
  laying up at ambient temperature the integrated lightning strike protection material directly onto a composite structure or a tool via controlled automated placement with the CTLM; and,
  laminating at ambient temperature the integrated lightning strike protection material onto the composite structure to form a composite structure with lightning strike protection, wherein the lightning strike protection material meets electromagnetic effects protection.

9. The method of claim 8 wherein the laying up step further comprises laying up the integrated lightning strike protection material directly onto a flat or a contoured composite skin structure.

10. The method of claim 8 wherein the laminating step further comprises laminating the lightning strike protection material onto an exposed surface of a composite skin.

11. The method of claim 8 wherein the surfacing layer has a thickness in a range of 0.002 inch to 0.075 inch, and the conductive layer has a thickness in a range of 0.0015 inch to 0.006 inch.

12. The method of claim 8 wherein the fiber reinforcement material layer is a scrim carrier comprising a fiberglass or carbon fiber reinforcement, a woven mat, or a knit polyester.

13. The method of claim 8 wherein the expanded metal foil comprises copper, aluminum, titanium, nickel, bronze, gold, silver, or alloys thereof.

14. The method of claim 8 wherein the tack layer has a thickness in a range of 0.0015 inch to 0.005 inch, and further wherein the tack layer comprises an epoxy-based resin material, a fiberglass-epoxy prepreg material, an adhesive material, or an organic polymer resin.

15. The method of claim 8 wherein the carrier layer comprises paper having a tackiness, and the carrier layer has a thickness in a range of 0.004 inch to 0.008 inch.

16. The method of claim 8 wherein the the parameter of flexibility is optimized by the expanded metal foil having the ability to flex in the x-y plane and in the z plane; the parameter of tack is optimized by the integrated lightning strike protection material having tack on both sides to stably spool in the CTLM and by the tack layer being compatible with the expanded metal foil and with the CTLM; the parameter of lightning strike protection is optimized by selecting the expanded metal foil and the organic polymer resin capable of meeting electromagnetic effects protection; and, the parameter of environmental performance is optimized by selecting the expanded metal foil and the organic polymer resin capable of meeting environmental durability requirements for the integrated lightning strike protection material.

17. A method for fabricating an aircraft composite structure having an integrated lightning strike protection material providing lightning strike protection, the method comprising:
  loading at ambient temperature an integrated lightning strike protection material into an automated contour tape laying machine (CTLM), wherein the integrated lightning strike protection material is optimized for controlled automated placement via the CTLM, the integrated lightning strike protection material comprising:
    a surfacing layer with a fiber reinforcement material layer, the surfacing layer including an organic polymer resin;
    a conductive layer comprising an expanded metal foil encapsulated in the organic polymer resin and having an ability to flex in an x-y plane and in a z plane, the conductive layer adjacent the surfacing layer;
    a tack layer adjacent the conductive layer, the tack layer being compatible with the expanded metal foil and with the CTLM; and,
    a carrier layer adjacent the tack layer, and,
    wherein the surfacing, conductive, tack, and carrier layers have parameters optimized for controlled automated placement via the CTLM, the parameters selected from the group consisting of flexibility, tack, lightning strike protection, and environmental performance;
  laying up at ambient temperature the integrated lightning strike protection material directly onto a composite structure or a tool via controlled automated placement with the CTLM; and,
  laminating at ambient temperature the integrated lightning strike protection material onto the composite structure to form an aircraft composite structure with lightning strike protection, wherein the lightning strike protection material meets electromagnetic effects protection.

18. The method of claim 17 wherein the aircraft composite structure comprises an aircraft wing zone, a wing tip zone, a fuselage zone, a tail zone, or a nose zone.

19. The method of claim 17 wherein the the surfacing layer has a thickness in a range of 0.002 inch to 0.075 inch, the conductive layer has a thickness in a range of 0.0015 inch to 0.006 inch, the tack layer has a thickness in a range of 0.0015 inch to 0.005 inch, and the carrier layer has a thickness in a range of 0.004 inch to 0.008 inch.

20. The method of claim 17 wherein the the parameter of flexibility is optimized by the expanded metal foil having the ability to flex in the x-y plane and in the z plane; the parameter of tack is optimized by the integrated lightning strike protection material having tack on both sides to stably spool in the CTLM and by the tack layer being compatible with the expanded metal foil and with the CTLM; the parameter of lightning strike protection is optimized by selecting the expanded metal foil and the organic polymer resin capable of meeting electromagnetic effects protection; and, the parameter of environmental performance is optimized by selecting the expanded metal foil and the organic polymer resin capable of meeting environmental durability requirements for the integrated lightning strike protection material.

* * * * *